(12) United States Patent
Thompson

(10) Patent No.: US 6,691,608 B1
(45) Date of Patent: Feb. 17, 2004

(54) FROZEN FOOD THAWING DEVICE

(76) Inventor: Brett D. Thompson, 106 SE. 77th St., Oak Island, NC (US) 28465

( * ) Notice: Subject to any disclaimer, the term of this patent is extended or adjusted under 35 U.S.C. 154(b) by 0 days.

(21) Appl. No.: 10/218,948

(22) Filed: Aug. 13, 2002

(51) Int. Cl.[7] .............................. A23L 1/00; A23L 3/00; A23C 3/02; A23C 9/02
(52) U.S. Cl. ............................ 99/483; 99/403; 99/487; 99/516; 99/536
(58) Field of Search .................... 99/483, 516, 577, 99/534–536, 403–418, 467, 477, 487, 348; 426/524, 523, 506, 238; 137/883, 560; 62/373, 376, 62, 64, 331; 366/101, 107, 136, 137, 132; 165/61; 392/360, 371, 379, 382

(56) References Cited

U.S. PATENT DOCUMENTS

| | | | | |
|---|---|---|---|---|
| 1,429,069 A | * | 9/1922 | Dunn | 134/177 |
| 2,155,868 A | * | 4/1939 | Pauly et al. | 134/57 R |
| 2,365,293 A | * | 12/1944 | Robinson | 210/125 |
| 3,604,334 A | | 9/1971 | Ballentine | 99/234 |
| 3,920,859 A | | 11/1975 | Foster | 426/520 |
| 4,062,277 A | | 12/1977 | Powers | 99/483 |
| 4,066,011 A | | 1/1978 | Ballentine | 99/467 |
| 4,269,036 A | | 5/1981 | Koide et al. | 62/159 |
| 4,504,498 A | | 3/1985 | Kissam | 426/238 |
| 4,571,092 A | * | 2/1986 | Switall | 366/348 |
| 4,623,544 A | * | 11/1986 | Highnote | 426/233 |
| 5,146,843 A | | 9/1992 | Fuller et al. | 99/483 |
| 5,442,994 A | | 8/1995 | Parker | 99/483 |
| 5,665,412 A | | 9/1997 | Fuller et al. | 426/524 |
| 5,797,270 A | | 8/1998 | Halterman et al. | 62/64 |
| 5,930,454 A | | 7/1999 | Cho | 392/360 |
| 6,116,043 A | | 9/2000 | Clark et al. | 62/376 |

* cited by examiner

Primary Examiner—Timothy F. Simone
(74) Attorney, Agent, or Firm—Michael E. Mauney

(57) ABSTRACT

A device for cheaply and quickly thawing frozen food and particularly frozen meat. A container impervious to water has a quick-release connection for connection to a pump. A second container for holding frozen food is immersed in the first container. The second container will have bores so that water will freely circulate from the first container to the second container. The pump recirculates water through both containers equalizing the water temperature in the container and more quickly thawing frozen food submerged within the water in the second container. A single pump may be connected to more than one water reservoir container making it possible to simply and quickly increase food thawing capacity by simply adding extra containers depending on the amount of frozen food to be thawed.

6 Claims, 2 Drawing Sheets

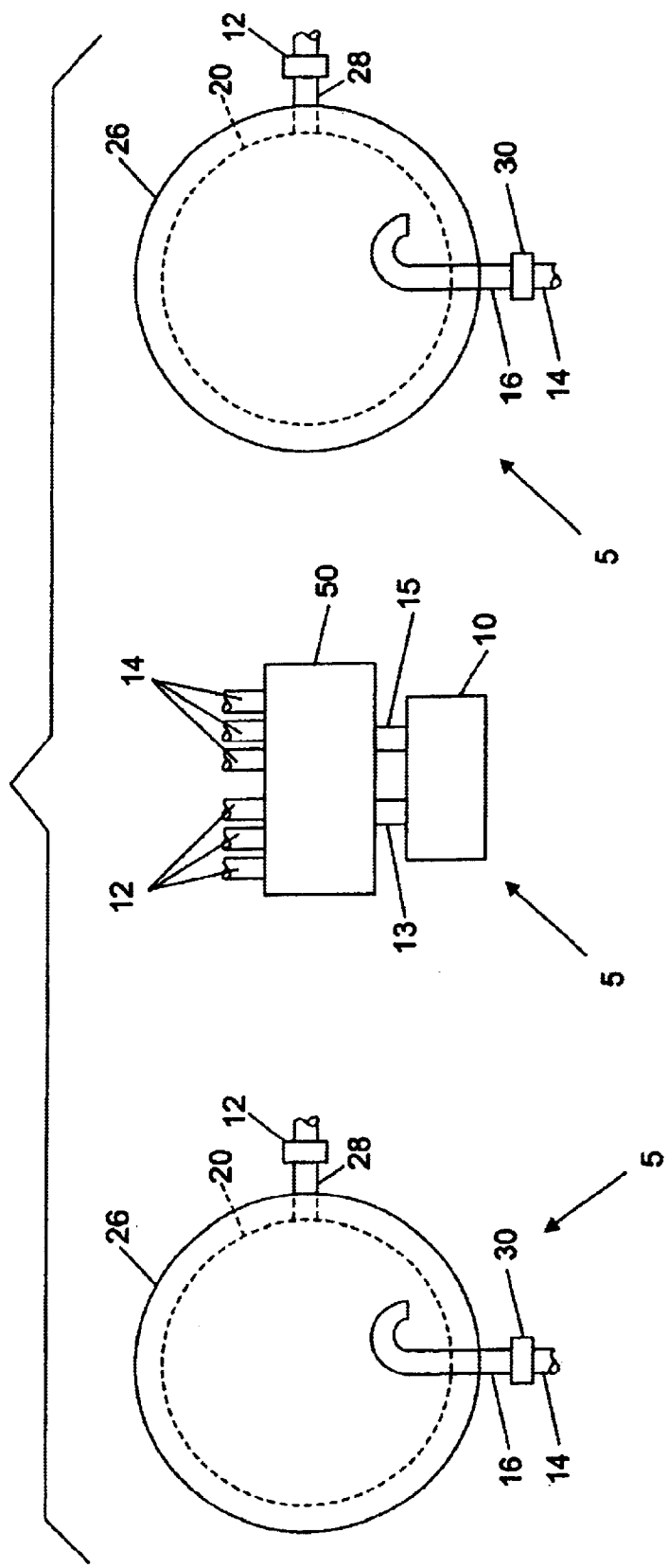

FROZEN FOOD THAWING DEVICE

FIELD OF THE INVENTION

This invention relates generally to food thawing and more particularly to a simple, inexpensive device to quickly and sanitarily thaw frozen food in a restaurant or institutional food setting.

BACKGROUND OF THE INVENTION

Food is commonly frozen both for transportation and to prolong the effective life of the food between the time it is harvested or processed and the time it is served. Meat in particular is subject to spoilage or to infection with dangerous bacteria Moreover, meat, because of its density and weight, thaws slowly compared to most other food products that might be frozen, like vegetables. Moreover, meat can rarely be cooked directly from the frozen state, but must be thawed first before cooking. Furthermore, meat is an expensive food and may form a substantial part of the cost of ingredients for a meal in a restaurant or an institutional setting. Moreover, meat can toughen, dry out or lose the quality if it is thawed improperly or too quickly.

Institutional food service or restaurants can plan ahead by thawing expected amounts of meat before the meat is required to be cooked. However, meat quickly spoils, especially if thawed at high temperatures. If too much meat is thawed, the meat can spoil , hence can be costly to a restaurant operator or institutional food operator. On the other hand, if an insufficient amount of meat is thawed to meet the demands, a restaurant may run out of the ingredients for a particular dish and lose the opportunity to serve that dish that evening, hence the profits that would be associated with service of that particularly popular dish. Consequently, in a restaurant or institutional food service setting there is a need to balance the need for quickly thawing food versus the impairment in the quality of the food that can be caused by a quick thawing process while keeping in mind the possibility of spoilage or bacterial infestation in the food and the need to meet health department requirements and to protect one's customers from infection. Consequently, there is no single satisfactory method for thawing food, although a variety of methods are employed.

One common method is to simply allow the meat to thaw in open air. However, this takes a substantial amount of time and is certainly one of the slowest way of thawing food. For a large piece of meat this may take twelve to fourteen hours. Moreover, it is possible the exposure to air during the period of time may cause the meat to become dried out. If the meat is left exposed too long to air, it may reach a temperature conducive to bacteria growth, hence lead to spoilage or infection.

The thawing process may b e accelerated by exposing the meat to forms of energy such as microwaves or heated air. This will accelerate the process of thawing, but can cook portions of the meat unless very carefully monitored. It is very difficult to maintain a constant temperature throughout a piece of meat because meat does not readily conduct heat, hence the outside portions of a cut of meat that is more exposed to the ambient energy, he it heated air or microwaves, may begin to cook before the inside portion of the meat is fully thawed. This is an undesirable result and may also facilitate bacteria growth in the meat being thawed in this fashion.

Another way of thawing meat is to put the meat in a sink filled with water. While this shortens the thawing time of the process, the water, unless recirculated, does not thaw the meat as fast as possible because the meat is not exposed to a constant water temperature because as the water chills around the meat, the temperature gradient between the meat surface and the water surface approaches stabilization and there is less thawing effect in the stagnant water. Moreover, even carefully packaged food may leak juices into the outside water or the outside water may seep into the packaged food. This is undesirable from a health standpoint if the sink is to be used for other things, unless the sink is carefully cleaned and disinfected. Moreover, this method ties a sink up for hours during the thawing process. One may choose to place the frozen item, especially meat, in a sink and run water over it. This means there is a constant flow of water at a constant temperature over the product that is to be thawed. However, there is no guarantee there will be complete coverage of the surface of the product as is the case when the product is completely submerged within a reservoir of liquid. Also, running water means at some point the water must overflow into a drain, resulting in a constant wastage of water at the flow rate of the water. The defrosting will operate most efficiently with a high flow rate which also guarantees a high wastage of the water involved. Using running water does not solve the problem of potential contamination of the sink by escaped juices from the meat product, nor does it solve the problem of using a sink during the period of time the meat is being thawed.

Consequently, a variety of devices that have been proposed that use a stand apart reservoir and recirculate water to thaw meat. Halterman et al. U.S. Pat. No. 5,797,270 proposes using a refrigerator chill device to thaw frozen food. Here there is a sealable chamber that circulates water chilled by coils to a temperature of 38 to 40 degrees. This device uses a refrigeration unit built into a housing, water is circulated through a circulation chamber and by the refrigeration unit to more quickly thaw food suspended is the circulation chamber. Fuller et al. U.S. Pat. No. 5,665,412 uses a sink-like device with a connected drain and faucet. Water is forcibly circulated through the sink-like water reservoir. When the circulated water reaches a certain level, it flows into a trough which collects any food particles, juices or debris that have broken loose from the food by the water circulation. There are other approaches such as using sound energy with a frequency spectrum matching the relaxation frequency spectrum of ice crystals as shown in Kissam, U.S. Pat. No. 4,504,498. Powers, U.S. Pat. No. 4,062,277 uses a spray field with sprayed water to pass over meat held in racks above a collection drain which recirculates the sprayed water. However, despite all this work no fully satisfactory method has been devised. Most restaurants thaw frozen food by exposing the food to an environment with a higher air temperature than freezing or by placing it in a sink and running water over it with the consequent water wastage and expense.

SUMMARY OF THE INVENTION

The present invention utilizes at least one water container that may be made like an off-the-shelf plastic bucket as a reservoir for water. At least one second container is used as a basket for suspending food in the reservoir of water in the first container. A pump is used to recirculated the water through both containers and to assure full and even exposure of the food product being thawed to the water held within the reservoir. This device avoids water wastage caused by running water in a sink, while assuring water circulation. The device is easily cleaned because the containers are easily washed by hand or by a mechanical dishwasher. This device reduces bacteria growth by maintaining a constant cooler thawing temperature as the food is thawed. This method is faster exposure to the ambient temperature in the environment and wastes less water, hence money, than running water over the food in a sink. These and other advantages of the current invention will be made more clear in the following description of a best mode for practicing the invention.

BRIEF DESCRIPTION OF THE DRAWINGS

FIG. 2 shows a portion of multi-reservoir embodiment of the current invention.

DETAILED DESCRIPTION OF THE DRAWINGS

Figure 1:
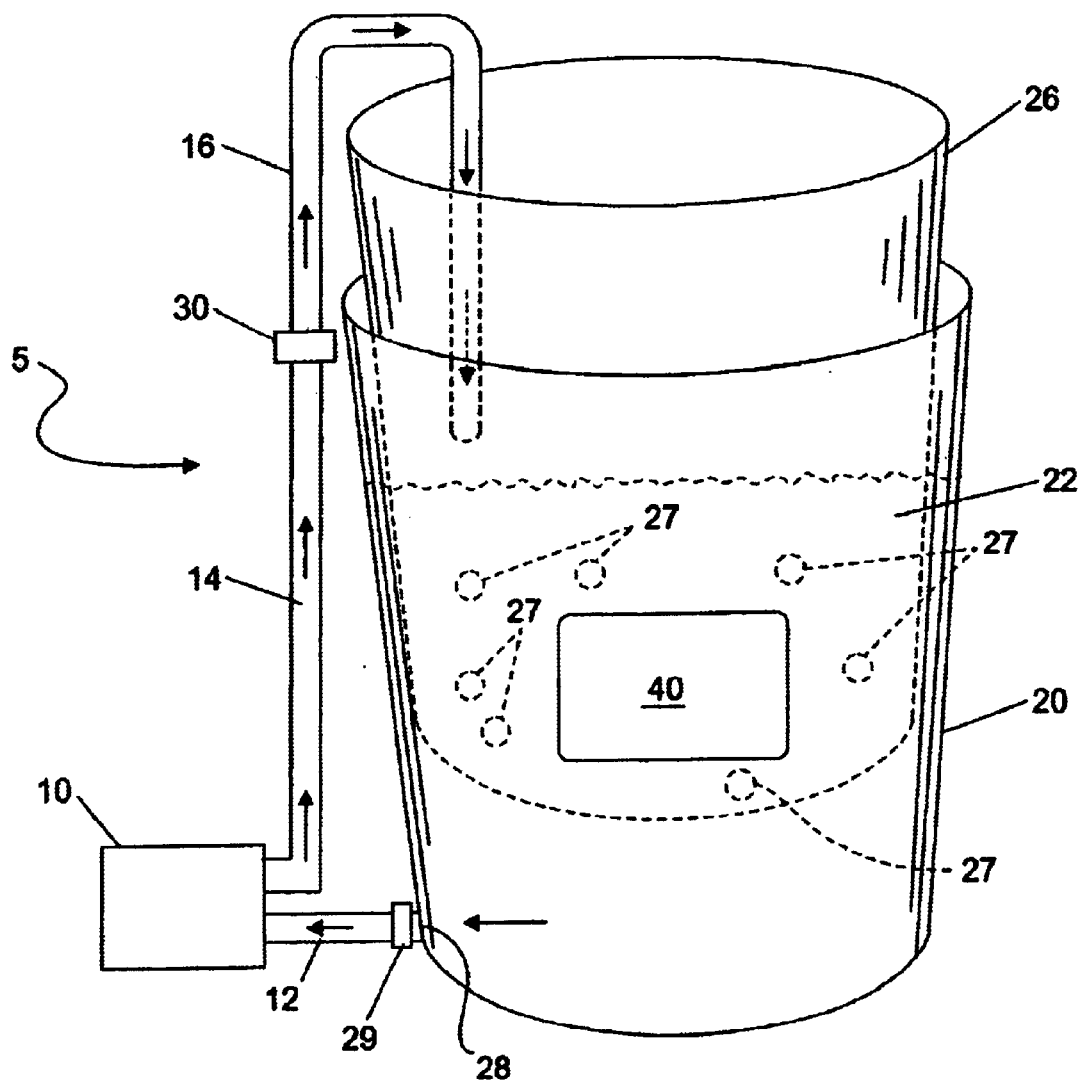
FIG. 1 shows a single reservoir embodiment of the current invention

FIG. 1 shows the food thawing device (5) in a side view. There is a water reservoir (20). This ordinarily will consist of a durable, non-corrosive bucket-like device. This water reservoir (20) should be impervious and easily cleaned. Stainless steel or various kinds of thermoplastics are suitable for the water reservoir (20). They can be cleaned and sterilized easily, are relatively inexpensive to fabricate, and can be made in a variety of sizes depending on the application in which the water reservoir (20) is used. Water (22) is approximately two-thirds the way up the lateral dimension of the water reservoir (20). A food reservoir (26) is shown nested within the water reservoir (20). Ordinarily, the food reservoir (26) will be of a similar construction, size, and material as the water reservoir (20) with the exception that in the food reservoir (26) there will be a number of openings (27) designed to maximize circulation of liquid within the food reservoir (26) and the water reservoir (20). The water reservoir (20) will have a water outlet (28) located at or near the bottom of the water reservoir (20). This will ordinarily have some sort of quick release connection (29) for the pump intake pipe (12) which leads to the pump (10). The pump (10) may be made of a variety of water-pumping technology materials and the size and capacity of the water pump (10) will depend on the application to which it is being used. The pump intake pipe (12) can be made of a variety of technologies, but it should be some smooth and impervious material that is easily cleaned. A variety of metal, including copper or stainless steel, or a variety of plastics currently used for pipes could be used for the pump intake pipe (12). Water (22) is drawn from the water reservoir (20) in the direction of the arrows through the water outlet (28) into the pump intake pipe (12) to the pump (10). It is then pumped through the water return pipe (14) to a quick-release connection (30). The water return pipe (14) is connected to the food reservoir pipe (16) which is designed to extend over and around the food reservoir bucket (26) to return pumped water (22) to the reservoir (20). A frozen food item (40) is shown within the food reservoir (26) but beneath the level of the water (22).

In use, the water reservoir (20) will be filled with an appropriate amount of water (22). A frozen food item (40) will be placed within the food reservoir (26) and placed within the water reservoir (20) so that the frozen food item (40) is beneath the water (22). The pump (10) will be connected to the water outlet (28) by the pump intake pipe (12). The food reservoir pipe (16) will be connected to the water return pipe (14) through the connection (30) so that the water will be redirected into the water reservoir (20). The pump (10) will then be turned on and water will begin to circulate around the frozen food item (40), maintaining a constant water temperature around the frozen food item (40) and facilitating the thawing of the food item (40) without any wastage of water and without any concerns of unsanitary conditions. When the frozen food item (40) is fully thawed, everything may be disconnected, cleaned and prepared for the next use.

FIG. 2 shows a portion of a multi-reservoir embodiment of the food thawing device (5) seen from above. Here a water manifold (50) is used with multiple pump intake pipes (12) and multiple water return pipes (14). The pipes feed into the manifold (50) which is connected to a pump inlet pipe (13) and a pump outlet pipe (15). One or more pump intake pipes (12) may be connected to the manifold (50) by a quick-release connection (not shown). The pump (10) will draw water into the manifold (50) and then into the pump (10) through the water inlet pipe (13) when connected to one or more pump intake pipes (12). Three are shown in this particular embodiment, but it will be readily appreciated that more could be employed depending on the size of the pump (10). Here, to simplify FIG. 2, only one water reservoir (20) and food reservoir (26) are shown. It will be appreciated that up to three of each could be used with the manifold (50) shown. Hence, water is pumped from a water reservoir (20) through the pump intake pipe (12) to the manifold (50) to the pump inlet pipe (13) then is passed through the pump outlet pipe (15) to the manifold (50) for distribution to multiple water return pipes (14) which lead to a quick-release connection (30) for connection to a food reservoir pipe (16) where the water will be returned to the food reservoir bucket (26). A circulation of water through multiple water reservoirs (20) can be easily achieved using a single pump (10) and a single manifold (50) with appropriate pipe connections. As long as the pump (10) has sufficient capacity to pump the required water for appropriate circulation, the use of the manifold (50) and multiple pipe connections will allow one or more water reservoirs (20) and food reservoir buckets (26) to be used to thaw multiple amounts of frozen food (40) placed within each food reservoir bucket (26).

It will be understood that the foregoing description of the best mode for practicing the invention is by way of illustration and not limitation. Details of construction may be varied by one of skill in the art without departing from the spirit of the invention. The only limitations are in the claims which follow.

I claim:

1. A frozen food thawing device comprising:
   (a) an impervious reservoir, of a definite size and shape, made of a definite material that is easily disinfected and cleaned, with at least one outlet in said reservoir;
   (b) a connection for said at least one outlet in said impervious reservoir whereby a first water transmission pipe may be attached and detached to said connection for said at least one outlet;
   (c) a pump with at least one water intake inlet and at least water outlet whereby said first water transmission pipe connected to said connection may be attached to said at least one water intake inlet on said pump;
   (d) a food reservoir constructed of an impervious material of a definite size and shape, said impervious material easily cleaned and disinfected, and said definite size and shape constructed so said food reservoir will fit within said impervious reservoir, said food reservoir having at least one opening therein;
   (e) a second water transmission pipe from said pump water outlet to said impervious reservoir and said food reservoir placed therein;

whereby a frozen food item will be placed in said food reservoir, said food reservoir placed inside said impervious reservoir, water added to said impervious reservoir sufficient to cover said frozen food item, and said pump activated to begin a circulation of water around said frozen food item to facilitate thawing of said frozen food item.

2. A frozen food thawing device of claim 1 wherein said impervious reservoir is a first plastic bucket and said food reservoir is a second plastic bucket that nests within said first plastic bucket reservoir.

3. A frozen food thawing device of claim 2 wherein said connection is a quick-release connection whereby said first water transmission pipe may be quickly attached and detached from said quick-release connection on said at least one outlet in said first plastic bucket.

4. A frozen food thawing device comprising:

(a) a plurality of impervious reservoirs wherein each said impervious reservoir in said plurality of reservoirs is a definite size and shape and made of a definite material that is easily disinfected and cleaned, with each said impervious reservoir in said plurality of reservoirs having at least one outlet;

(b) a connection for said at least one outlet in each said impervious reservoir in said plurality of impervious reservoirs;

(c) a plurality of food reservoirs of a definite size and shape and constructed of an impervious material, said impervious material easily cleaned and disinfected, each of said food reservoirs in said plurality of food reservoirs having at least one opening therein;

(d) a pump with means for a first plurality of water inlets and means for a second plurality of water outlets;

(e) means for connecting said plurality of pump water inlets to said connection on each impervious reservoir in said plurality of impervious reservoirs;

(f) means for pumping water from said means for said second plurality of water outlets for said pump to said plurality of impervious reservoirs;

whereby one pump distributes water to thaw a plurality of frozen food items that may be placed in each of said plurality of food reservoirs, each one of said plurality of food reservoirs placed inside one of said impervious reseroir of said plurality of reservoirs whereby said pump may begin a circulation of water around said plurality of frozen food items to facilitate thawing of said plurality of frozen food items.

5. A frozen food thawing device of claim 4 wherein said means for a first plurality of water inlets and means for a second plurality of water outlets is a manifold, said manifold connected to said pump.

6. A frozen food thawing device of claim 5 wherein said plurality of impervious reservoirs is first plurality of plastic buckets and said plurality of food reservoirs is a second plurality of plastic buckets.

* * * * *